(12) United States Patent
Park et al.

(10) Patent No.: US 11,639,298 B2
(45) Date of Patent: May 2, 2023

(54) WATER PURIFIER

(71) Applicant: Samsung Electronics Co., Ltd., Suwon-si (KR)

(72) Inventors: Jungha Park, Suwon-si (KR); Jongho Lee, Suwon-si (KR); Yeonwoo Cho, Suwon-si (KR); Sungpil Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 181 days.

(21) Appl. No.: 17/150,089

(22) Filed: Jan. 15, 2021

(65) Prior Publication Data

US 2021/0214242 A1    Jul. 15, 2021

(30) Foreign Application Priority Data

Jan. 15, 2020    (KR) .................. 10-2020-0005419

(51) Int. Cl.
*C02F 1/44*    (2023.01)
*C02F 1/00*    (2023.01)
*C02F 9/00*    (2023.01)
*B01D 29/52*    (2006.01)
(Continued)

(52) U.S. Cl.
CPC .............. *C02F 1/441* (2013.01); *B01D 29/52* (2013.01); *B01D 29/56* (2013.01); *B01D 29/60* (2013.01);
(Continued)

(58) Field of Classification Search
CPC .. C02F 1/441; C02F 1/003; C02F 9/00; C02F 2307/14; C02F 2209/40; C02F 2307/10; C02F 9/005; C02F 1/001; C02F 1/283; C02F 1/42; C02F 1/44; C02F 1/004; B01D 29/52; B01D 29/60; B01D 35/147; B01D 35/1573; B01D 35/306; B01D 63/00; B01D 29/50; B01D 29/56; B01D 61/029; B01D 61/04; B01D 61/149; B01D 61/16;
(Continued)

(56) References Cited

U.S. PATENT DOCUMENTS 5,547,584 A * 8/1996 Capehart ................. C02F 1/283
                                                  210/764
5,972,216 A * 10/1999 Acernese ................ C02F 9/005
                                                  210/259

(Continued)

FOREIGN PATENT DOCUMENTS

CN    211562393 U    9/2020
GN    107902786 A    4/2018
(Continued)

OTHER PUBLICATIONS

International Search Report dated May 3, 2021, issued in International Patent Application No. PCT/KR2021/000151.

*Primary Examiner* — Joseph W Drodge
(74) *Attorney, Agent, or Firm* — Jefferson IP Law, LLP

(57) ABSTRACT

A water purifier is provided. The water purifier includes a raw water flow path provided to introduce raw water from an outside, a clean water flow path connected to the raw water flow path, pre-treatment filters arranged in parallel on the clean water flow path to filter the raw water, and a water purifying filter arranged on the clean water flow path to receive clean water discharged from the pre-treatment filters.

14 Claims, 6 Drawing Sheets

(51) Int. Cl.
  *B01D 29/56* (2006.01)
  *B01D 29/60* (2006.01)
(52) U.S. Cl.
  CPC ............... *C02F 1/003* (2013.01); *C02F 9/00* (2013.01); *C02F 2307/14* (2013.01)
(58) Field of Classification Search
  CPC .............. B01D 61/58; B01D 2201/302; B01D 2311/04; B01D 2311/06; B01D 2311/25; B01D 2311/253; B01D 2311/2649; B01D 2313/13; B01D 2313/18; B01D 2313/901; B01D 2317/02; B01D 2317/025; B01D 2317/04; B01D 2319/02; B01D 2319/025; B01D 2319/04
  See application file for complete search history.

(56) References Cited

U.S. PATENT DOCUMENTS

2006/0091059 A1* 5/2006 Barbaro ................ B01D 24/46 210/108
2011/0257788 A1* 10/2011 Wiemers ................... C02F 1/20 700/271
2014/0190909 A1* 7/2014 Taniguchi ............... C02F 1/441 210/801
2017/0368505 A1* 12/2017 Gillespie ................ C02F 1/008
2018/0370831 A1* 12/2018 Moon ..................... C02F 1/003
2020/0011464 A1 1/2020 Kim et al.

FOREIGN PATENT DOCUMENTS

| | | |
|---|---|---|
| JP | 2012-076072 A | 4/2012 |
| KR | 20-0403991 | 12/2005 |
| KR | 10-2009-0022122 A | 3/2009 |
| KR | 10-2012-0126840 A | 11/2012 |
| KR | 10-2012-0132348 A | 12/2012 |
| KR | 10-2014-0043624 A | 4/2014 |
| KR | 10-1504545 B1 | 3/2015 |
| KR | 10-1604017 B1 | 3/2016 |
| KR | 10-1782543 B1 | 9/2017 |
| KR | 10-1810814 A | 1/2018 |
| KR | 10-2018-0044250 A | 5/2018 |
| KR | 10-2019-0023589 A | 3/2019 |

* cited by examiner

WATER PURIFIER

CROSS-REFERENCE TO RELATED APPLICATION(S)

This application is based on and claims priority under 35 U.S.C. § 119 of a Korean patent application number 10-2020-0005419, filed on Jan. 15, 2020 in the Korean Intellectual Property Office, the disclosures of which is incorporated by reference herein in its entirety.

BACKGROUND

1. Field

The disclosure relates to a water purifier. More particularly, the disclosure relates to an arrangement of filters of a water purifier.

2. Description of the Related Art

In general, a water purifier is a device that filters water introduced thereinto using one or more water filters to supply clean water to a user. The water purifier employs a plurality of filters to implement water purification performance. In this case, the water purifier mainly employs an arrangement in which the filters are aligned in a row so that clean water flows in a certain direction.

The water purifier according to the related art includes a filter portion for purifying raw water using filters, a filter head portion for branching clean water, and a fixing portion for fixing the filter head portion. In this case, flow paths in the filters aligned in a row and the filter head portion may be provided to flow water only in one direction.

In addition, when a plurality of filters is adopted and connected in a row, the resistance on the flow path increases and the flow rate decreases, so that it is difficult to achieve a desired outflow rate, causing limitation in the number of available filters, and difficulty in employing various filters. In addition, when various types of filters are used, replacing the filters is inconvenient due to different replacement cycles of the filters.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a water purifier capable of easily changing the arrangement of filters.

Another aspect of the disclosure is to provide a water purifier capable of increasing the outflow pressure by reducing a flow path resistance.

Another aspect of the disclosure is to provide a water purifier capable of reducing replacement cycle by extending the lifespan of a filter.

Additional aspects will be set forth in part in the description which follows and, in part, will be apparent from the description, or may be learned by practice of the presented embodiments.

In accordance with an aspect of the disclosure, a water purifier is provided. The water purifier includes a raw water flow path provided to introduce raw water from an outside of the water purifier, a clean water flow path connected to the raw water flow path, a plurality of pre-treatment filters arranged in parallel on the clean water flow path to filter the raw water, and a water purifying filter arranged on the clean water flow path to receive clean water discharged from the plurality of pre-treatment filters.

The water purifier may further include a post-treatment filter arranged on the clean water flow path to receive the clean water discharged from the water purifying filter.

The plurality of pre-treatment filters may be arranged in a first direction.

The water purifying filter may be arranged in the first direction with respect to the plurality of pre-treatment filters.

The water purifying filter may be arranged in a second direction with respect to the plurality of pre-treatment filters, the second direction being different from the first direction.

The water purifier may further include a post-treatment filter arranged in the first direction with respect to the water purifying filter.

The second direction may be perpendicular to the first direction.

Each of the plurality of pre-treatment filters and the water purifying filter may include a raw water inlet formed to allow raw water to be introduced in a longitudinal direction of the plurality of pre-treatment filters and the water purifying filter, and a clean water outlet formed to allow filtered clean water to be discharged in a direction opposite to an introduction direction of the raw water inlet.

The water purifier may further include a plurality of inlet valves installed upstream of the plurality of pre-treatment filters with respect to a direction in which water flows to control opening and closing of the clean water flow path.

The water purifier may further include a drain flow path through which the clean water passed through the water purifying filter is discharged to reduce a flow resistance on the clean water flow path, and an outlet flow path connected to the clean water passed through the post-treatment filter.

The water purifier may further include a branch pipe arranged on the clean water flow path to branch the raw water to the plurality of pre-treatment filters.

The branch pipe may include a first pipe, and the water purifier may further include a second pipe formed to allow the clean water discharged from the plurality of pre-treatment filters to be introduced to the water purifying filter.

The plurality of pre-treatment filters may include a plurality of composite filters of a same type, and the water purifying filter may include a membrane filter.

The water purifier may further include an input portion configured to receive a selection for the plurality of pre-treatment filters, and a control portion configured to control opening and closing of the plurality of inlet valves according to information received from the input portion.

In accordance with another aspect of the disclosure, a water purifier is provided. The water purifier includes a raw water flow path provided to introduce raw water from an outside of the water purifier, a plurality of branch flow paths branched from the raw water flow path, a plurality of pre-treatment filters arranged respectively on the plurality of branch flow paths, a water purifying filter provided to receive clean water discharged from the plurality of pre-treatment filters, and a post-treatment filter provided to receive the clean water discharged from the water purifying filter.

The plurality of pre-treatment filters may be arranged in a first direction.

The water purifying filter may be arranged in the first direction with respect to the plurality of pre-treatment filters.

The post-treatment filter may be arranged in the first direction with respect to the water purifying filter.

The water purifying filter may be arranged in a second direction perpendicular to the first direction with respect to the plurality of pre-treatment filters, and the post-treatment filter may be arranged in the first direction with respect to the water purifying filter.

In accordance with another aspect of the disclosure, a water purifier is provided. A water purifier includes a raw water flow path provided to introduce raw water from an outside of the water purifier, a plurality of branch flow paths branched from the raw water flow path, a plurality of pre-treatment filters arranged respectively on the plurality of branch flow paths, and a water purifying filter provided to receive clean water discharged from the plurality of pre-treatment filters, wherein each of the plurality of pre-treatment filters and the water purifying filter includes a raw water inlet formed to allow the raw water to be introduced in a longitudinal direction of the plurality of pre-treatment filters and the water purifying filter, and a clean water outlet formed to allow filtered clean water to be discharged in a direction opposite to an introduction direction of the raw water inlet.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terminology used herein is for the purpose of describing particular embodiments only and is not intended to limit the disclosure. It is to be understood that the singular forms "a," "an," and "the" include plural references unless the context clearly dictates otherwise. It will be further understood that the terms "include", "comprise" and/or "have" when used in this specification, specify the presence of stated features, integers, operations, elements, and/or components, but do not preclude the presence or addition of one or more other features, integers, operations, elements, components, and/or groups thereof.

The terms including ordinal numbers like "first" and "second" may be used to explain various components, but the components are not limited by the terms. The terms are only for the purpose of distinguishing a component from another. Thus, a first element, component, region, layer or section discussed below could be termed a second element, component, region, layer or section without departing from the teachings of the disclosure. Descriptions shall be understood as to include any and all combinations of one or more of the associated listed items when the items are described by using the conjunctive term "~ and/or ~," or the like.

The terms "front", "rear", "upper", "lower", "top", and "bottom" as herein used are defined with respect to the drawings, but the terms may not restrict the shape and position of the respective components.

Hereinafter, embodiments of the disclosure will be described in detail with reference to the accompanying drawings.

Figure 1:
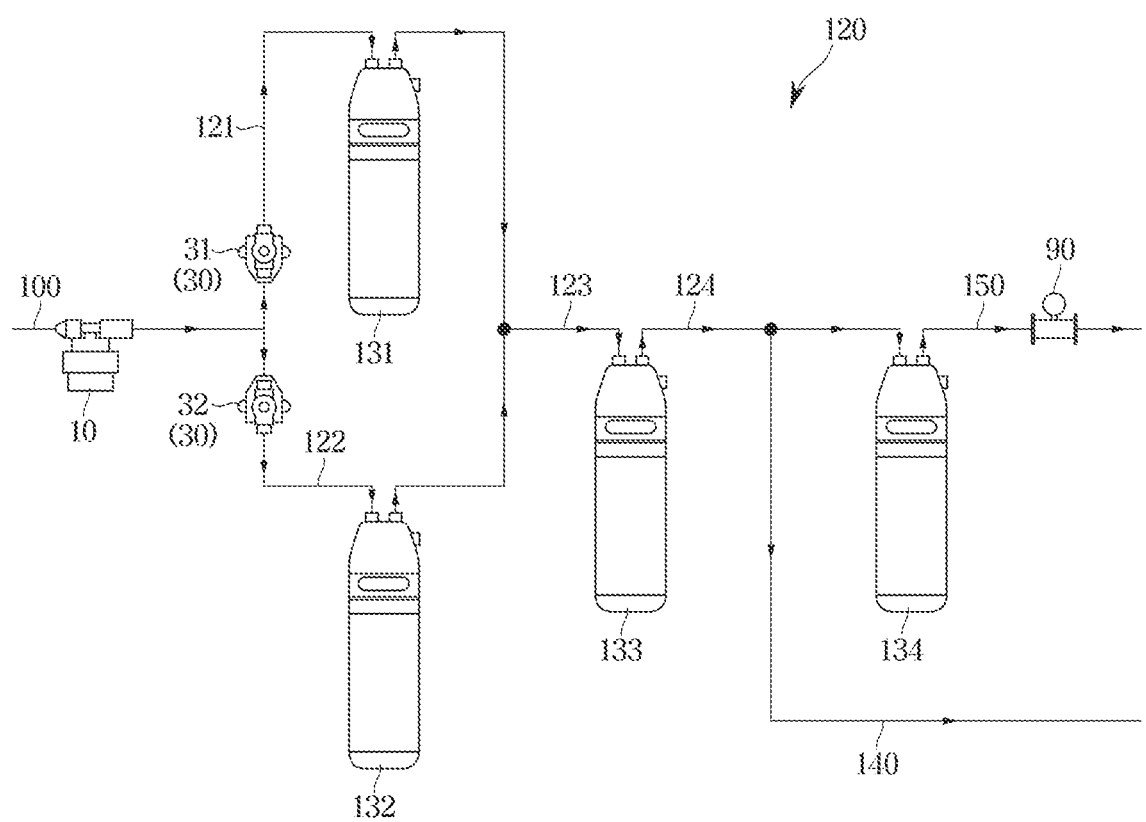
FIG. 1 is a view illustrating a water purifier according to an embodiment of the disclosure.

FIG. 1 is a view illustrating a water purifier according to an embodiment of the disclosure.

Referring to FIG. 1, a water purifier may include a raw water flow path 100 provided to introduce raw water from the outside.

The water purifier may include a clean water flow path 120 connected to the raw water flow path 100 so that the raw water may be purified. The water purifier may include a plurality of pre-treatment filters disposed on the clean water flow path 120 to filter raw water. The plurality of pre-treatment filters may include a first filter 131 and a second filter 132.

The first filter 131 and the second filter 132 may be disposed in parallel. Clean water discharged from the first filter 131 and the second filter 132 may flow to a third filter 133 and a fourth filter 134 connected in series. By arranging the plurality of pre-treatment filters in parallel, the effect of increasing the outflow pressure may be obtained. When the filters are provided with the same type, the water treatment volume is reduced by half and thus the life of the filter may be extended. Accordingly, inconvenience due to filter replacement may be minimized and user convenience may be achieved.

The pre-treatment filter may include a pre carbon filter, a precipitation filter, a high turbidity filter, and a composite filter in which a precipitation filter and a pre carbon filter are combined. Since the composite filter is used for the pre-treatment filter, the pre-treatment filter may remove large foreign substances while removing chlorine, organic compounds, odors, and pigments through adsorption. When filters of the same type are used, the replacement cycles of the filters may be led to the same, so that replacement of the filters is facilitated. In addition, the pre-treatment filter may include a Granular Activated Carbon (GAC) filter, a block carbon filter, and a filter processed by high heat treatment of coconut. Some of the above components may be omitted.

In the drawing, the pre-treatment filters are illustrated as including two pre-treatment filters, but are not limited thereto and may include three or more pre-treatment filters.

The third filter 133 and the fourth filter 134 may be disposed on the clean water flow path 120. The third filter 133 may be a water purifying filter, including a water-permeable membrane filter. The fourth filter 134 may be a post-treatment filter, including a post carbon filter. Some of the above components may be omitted.

Specifically, the third filter 133 may include one of an ultrafiltration membrane, a nanofiltration membrane, and a reverse osmosis membrane.

More specifically, the ultrafiltration membrane may include micro pores having a pore diameter larger than or equal to 0.005 micrometers and smaller than or equal to 0.5 micrometers, and the nanofiltration membrane may include micro pores having a pore diameter larger than or equal to 0.001 micrometers and smaller than 0.005 micrometers, and the reverse osmosis membrane may include micro pores having a pore diameter larger than or equal to 0.0001 micrometers and smaller than 0.001 micrometer.

The fourth filter 134 may improve water taste by adsorbing fine substances and removing gas components and odors. The fourth filter 134 may include a Granular Activated Carbon (GAC) filter, a Block carbon filter, a Silver carbon filter, a DeIonization Resin (DI resin) filter, and a Taste Chlorine Reduction (TCR) filter. Some of the above components may be omitted.

The third filter 133 and the fourth filter 134 may include a composite filter in which a membrane filter and a post-treatment filter are combined.

In various embodiments, the filter may be one of the above described various filters or a combination thereof. Further, the filters according to embodiments of the disclosure are not limited to the above-described filters, and may include a new filter according to technological development.

The clean water flow path 120 may be branched from the raw water flow path 100 into a plurality of units thereof, that is, a plurality of branch flow paths. The clean water flow path 120 may include a first clean water flow path 121, a second clean water flow path 122, a third clean water flow path 123, and a fourth clean water flow path 124. Some of the above components may be omitted.

The first clean water flow path 121 may be connected to the raw water flow path 100 and formed on the upstream side of the first filter 131. The second clean water flow path 122 may be connected to the raw water flow path 100 and formed on the upstream side of the second filter 132. The third clean water flow path 123 may be formed from a connection point between the downstream side of the first filter 131 and the downstream side of the second filter 132 to the upstream side of the third filter 133. The fourth clean water flow path 124 may be connected to the third filter 133 and formed to a connection point between a drain flow path 140 and the clean water flow path 120.

The clean water flow path 120 may include a plurality of valves 30 that open or close the flow path so as to allow or block raw water to flow or from flowing into the clean water flow path 120. The plurality of valves 30 may include a plurality of inlet valves 31 and 32. The plurality of inlet valves 31 and 32 may be installed upstream of the plurality of pre-treatment filters in the direction in which water flows, so as to control the opening and closing of the clean water flow path 120. Some of the above components may be omitted.

The plurality of inlet valves 31 and 32 may include a first inlet valve 31 and a second inlet valve 32. The first inlet valve 31 may be installed on the upstream side of the first filter 131 to control opening and closing of the first clean water flow path 121. The second inlet valve 32 may be installed on the upstream side of the second filter 132 to control opening and closing of the second clean water flow path 122. The plurality of inlet valves 31 and 32 may be opened and closed by a control portion to be described below. Some of the above components may be omitted.

The raw water flow path 100 may be provided with a pressure reducing valve 10 for reducing the water pressure of the raw water.

The pre-treatment filter, the water purifying filter, and the post-treatment filter may each include an inlet through which raw water or clean water flows in the longitudinal direction of the filter, and an outlet through which filtered clean water is discharged in a direction opposite to the introduction direction of the inlet. Some of the above components may be omitted. The inlet and outlet of each of the pre-treatment filter, the water purifying filter, and the post-treatment filter may be provided in a head portion to be described below so that water flows in opposite directions. Accordingly, a long flow path is provided in the filter so that a large amount of foreign substances is filtered out.

The water purifier 1 may include the drain flow path 140 which is separately formed by branching from a middle portion of the clean water flow path, and through which clean water passed through the water purifying filter is discharged to reduce flow resistance on the clean water flow path 120. In addition, the water purifier 1 may include an outlet flow path 150 through which clean water passed through the post-treatment filter is supplied to the user. Some of the above components may be omitted.

The drain flow path 140 may be used to discharge removal water in which contaminants are concentrated, in addition to purified clean water.

The outlet flow path 150 may further include a flow meter 90 for measuring the amount of clean water. The amount of clean water in the water purifier may be measured through the flow rate measured by the flow meter 90. Through this, an appropriate replacement time of each filter may be identified.

The water purifier 1 may further include at least one pump (not shown). The pump may pump clean water discharged from at least one pre-treatment filter to flow to the third filter 133 and the fourth filter 134.

In the water purifier according to the embodiment of the disclosure, the filters may be provided in a refrigerator, and may be disposed inside the refrigerator to supply clean water from a refrigerator dispenser. However, the disclosure is not limited thereto and the filters may be disposed outside the refrigerator to supply clean water.

Figure 2:
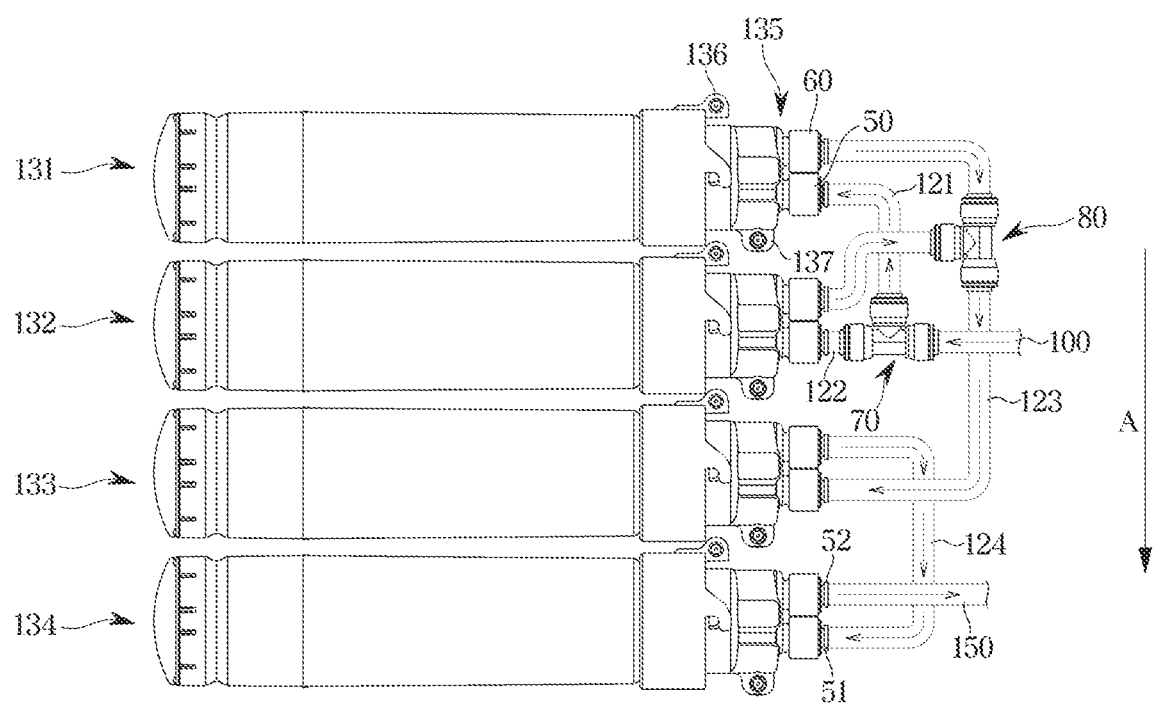
FIG. 2 is a view illustrating an arrangement of filters in the water purifier according to an embodiment of the disclosure.

FIG. 2 is a view illustrating an arrangement of filters in the water purifier according to an embodiment of the disclosure.

Referring to FIG. 2, the first filter 131, the second filter 132, the third filter 133, the fourth filter 134, a first pipe 70, and a second pipe 80 may be disposed on the clean water flow path 120. Some of the above components may be omitted.

Each filter may be provided at one side with a head portion 135. Each head portion 135 may include an inlet 50 provided to allow raw water or clean water to be introduced in the longitudinal direction of the filter, and an outlet 60 provided to allow filtered clean water to be discharged in a direction opposite to the introduction direction of the inlet 50. Since the inlet 50 and the outlet 60 of each head portion 135 are provided parallel to each other to have directions opposite to each other, a long flow path is provided in the filter so that a large amount of foreign substances may be filtered out. Since the filter is provided in plural, the head portion 135 is also provided in plural.

In the above drawing, the filters are illustrated as including four filters, but the number of filters is not limited thereto, and less than or more than four filters may be provided.

The first filter 131 and the second filter 132, i.e., the plurality of pre-treatment filters, may be arranged in a first direction A. The third filter 133, i.e., the water purifying filter, may be arranged in the first direction A with respect to the plurality of pre-treatment filters. The fourth filter 134, i.e., the post-treatment filter, may be extended in the first direction A with respect to the water purifying filter. Such an arrangement in the first direction may increase the spatial utilization of the arrangement of the water purifier filters. In the drawing, all of the filters are arranged in the first direction, but the disclosure is not limited thereto and the filters may be freely arranged.

The clean water flow path 120 may further include a branch pipe disposed on the clean water flow path to branch raw water into the plurality of pre-treatment filters, and the second pipe 80 through which clean water discharged from the plurality of pre-treatment filters is introduced into the water purifying filter. The branch pipe may include the first pipe 70.

The first pipe 70 and the second pipe 80 may allow the flow path to be branched or combined using a small number of components.

Each filter may include a first fixing pin 136 and a second fixing pin 137. The first fixing pin 136 and the second fixing pin 137 may serve to fix the filter such that the filter is attached to or mounted within one side of the water purifier 1.

The inlet 50 may include an inlet port 51. The outlet 60 may include an outlet port 52. The inlet port 51 and the outlet port 52 may be provided to protrude to the outside of the head portion 135.

Referring to FIG. 2, the drain flow path 140 may be omitted. That is, the fourth clean water flow path 124 may be connected between the third filter 133 and the fourth filter 134.

In the water purifier according to the embodiment of the disclosure, the filters may be provided in a refrigerator, and may be disposed inside the refrigerator to supply clean water from a refrigerator dispenser. However, the disclosure is not limited thereto and the filters may be disposed outside the refrigerator to supply clean water.

Figure 3:
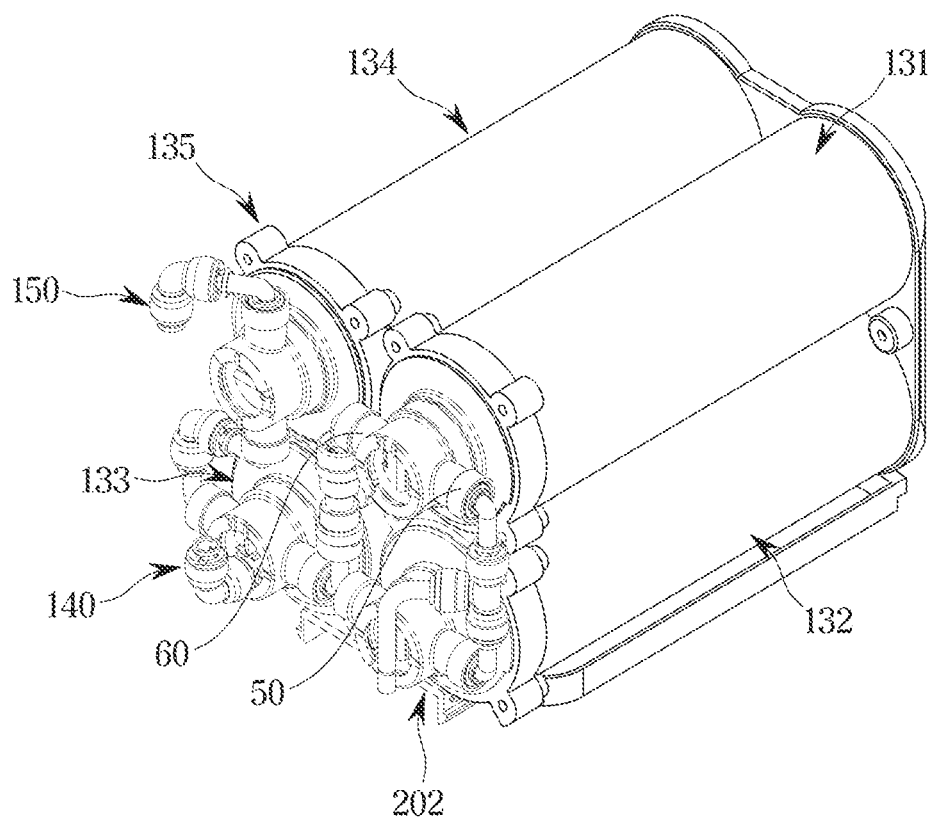
FIG. 3 is a view illustrating an arrangement of filters in a water purifier according to an embodiment of the disclosure.
Figure 3:
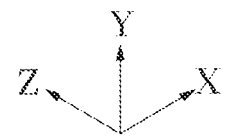

FIG. 3 is a view illustrating an arrangement of filters in a water purifier 202 according to an embodiment of the disclosure.

Referring to FIG. 3, a first filter 131 and a second filter 132, i.e., a plurality of pre-treatment filters may be arranged in a first direction (e.g., Y direction in an X-Y-Z axis). A third filter 133, i.e., a water purifying filter, may be arranged in a second direction (e.g., Z direction) with respect to the plurality of pre-treatment filters. The second direction (Z direction) may be arranged perpendicular to the first direction (Y direction). A fourth filter 134, i.e., a post-treatment filter, may be arranged in the first direction with respect to the water purifying filter. Some of the above components may be omitted. In the drawing, the second direction (Z direction) is illustrated as a direction perpendicular to the first direction (Y direction), but is not limited thereto, and the second direction may form an acute or obtuse angle with the first direction. With such an arrangement, the distance between the filters is shortened, flow resistance is reduced, and the amount of outflow may be increased.

The first filter 131 and the second filter 132, i.e., a plurality of pre-treatment filters, may be disposed in parallel. Clean water discharged from the first filter 131 and the second filter 132 may flow to the third filter 133 and the fourth filter 134 connected in series.

The filter includes an inlet 50 provided to allow raw water or clean water to be introduced in a direction perpendicular to the longitudinal direction of the filter, and an outlet 60 provided to allow filtered clean water to be discharged in a direction parallel to the introduction direction of the inlet 50. Some of the above components may be omitted. Since the inflow direction and the outflow direction are provided parallel to each other in each head portion, a long flow path is provided in the filter so that a large amount of foreign substance is filtered out.

Since the filter is provided to have a long flow path perpendicular to the length direction of the filter, a lot of foreign matter may be filtered out, and since the flow path distance to the next filter is provided to be shortened, the flow resistance is reduced.

The drain flow path 140 may be formed to protrude in the longitudinal direction of the third filter 133. The resistance of the flow path may be reduced through the drain flow path 140. The outlet of the fourth filter 134 may be provided to be connected to the outlet flow path 150.

In the water purifier according to the embodiment of the disclosure, the filters may be provided in a refrigerator, and may be disposed inside the refrigerator to supply clean water from a refrigerator dispenser. However, the disclosure is not limited thereto and the filters may be disposed outside the refrigerator to supply clean water.

Figure 4:
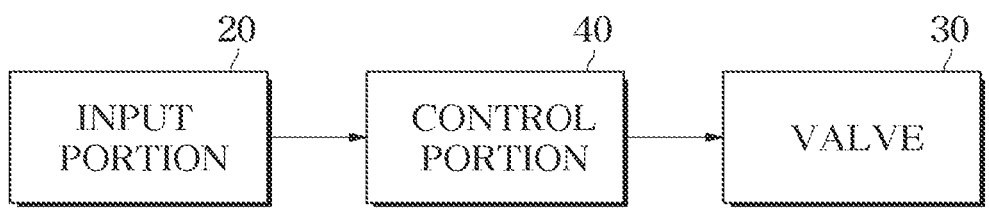
FIG. 4 is a block diagram illustrating a control flow according to an embodiment of the disclosure.

FIG. 4 is a block diagram illustrating a control flow according to an embodiment of the disclosure Referring to FIG. 4, the water purifier includes an input portion 20 provided to receive selection for the plurality of pre-treatment filters from a user, and a control portion 40 (e.g., at least one processor) for controlling opening and closing of the plurality of inlet valves 31 and 32 by receiving information from the input portion 20. Some of the above components may be omitted.

The user may use the pre-treatment filter desired to be used through the input portion 20 so that the inlet valves 31 and 32 are opened or closed. The control portion 40 may open or close the inlet valves 31 and 32 by receiving information about the pre-treatment filter selected by the input portion 20.

That is, the flow rate of raw water flowing through the selected filter may be adjusted. For example, when the first filter 131 is used and the second filter 132 is not used, the first inlet valve 31 may be opened and the second inlet valve 32 may be closed, and conversely, when the first filter 131 is not used and the second filter 132 is used, the first inlet valve 31 may be closed and the second inlet valve 32 may be opened.

In addition, when the flow rate through the first filter 131 is set to "large", a large amount of water flows through the first filter 131, and when the flow rate of water through the second filter 132 is set to "small", a small amount of water may flow through the second filter 132. However, the disclosure is not limited thereto.

Such a configuration enables the use according to the life of the filter, and when the pre-treatment filters are provided in different types, allows desired characteristics of outflow to be selected according to the user's preference.

Figure 5:
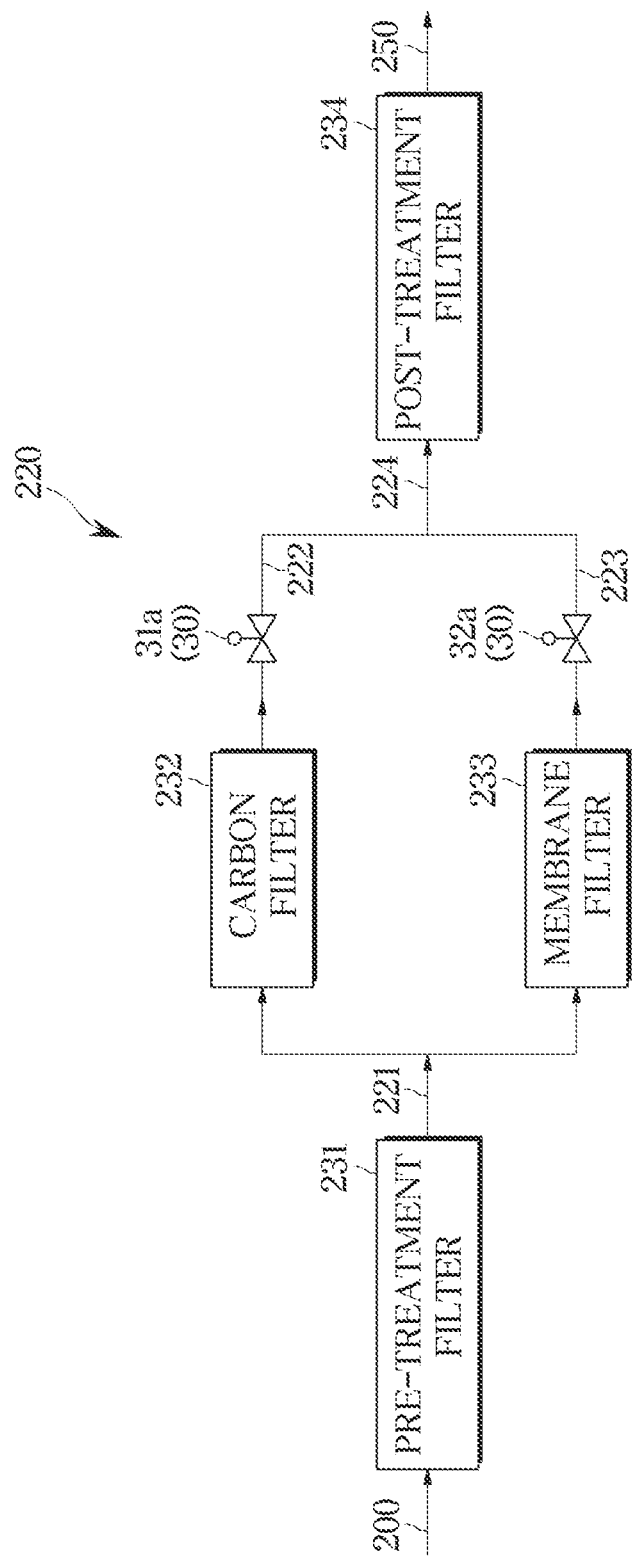
FIG. 5 is a view illustrating a water purifier according to an embodiment of the disclosure.

FIG. 5 is a view illustrating a water purifier according to an embodiment of the disclosure.

Referring to FIG. 5, a water purifier 1 may include a raw water flow path 200 provided to introduce raw water from the outside.

The water purifier 1 may include a clean water flow path 220 connected to the raw water flow path 200 so that raw water may be purified. The water purifier may include a pre-treatment filter disposed on the clean water flow path 220 to filter raw water. The pre-treatment filter may include a first filter 231.

The water purifier may include a plurality of water purifying filters disposed on the clean water flow path 220. The plurality of water purifying filters may include a second filter 232 and a third filter 233.

The second filter 232 and the third filter 233 may be disposed in parallel. Clean water discharged from the first filter 231 may be branched into a plurality of flow paths to flow to the second filter 232 and the third filter 233. The clean water discharged from the second filter 232 and the third filter 233 may flow to the fourth filter 234 connected in series thereto. By arranging the plurality of water purifying filters in parallel, the effect of increasing the outflow pressure may be obtained. In the drawing, the plurality of water purifying filters is illustrated as being different types of filters, but the disclosure is not limited thereto. When the filters are provided with the same type, the water treatment volume is reduced by half and thus the life of the filter may be extended. Accordingly, inconvenience due to frequent filter replacement may be minimized and user convenience may be achieved. When the filters are provided in different types, a desired water purifying filter may be used through a check valve to be described below.

The second filter 132 and the third filter 133, i.e., a plurality of water purifying filters, may include a carbon filter, a membrane filter, a high turbidity filter, and a composite filter in which a precipitation filter and a pre carbon filter are combined. Some of the above components may be omitted.

By arranging the plurality of post-treatment filters in parallel, the effect of increasing the outflow pressure may be obtained. When the filters are provided with the same type, the water treatment volume is reduced by half and thus the life of the filter may be extended. Accordingly, inconvenience due to filter replacement may be minimized and user convenience may be achieved.

On the clean water flow path 220, the post-treatment filter may be disposed. The post-treatment filter may include the fourth filter 234. The fourth filter 234 may include a post-carbon filter. Some of the above components may be omitted.

In various embodiments, the filter may be one of the above described various filters or a combination thereof. Further, the filters according to embodiments of the disclosure are not limited to the above-described filters, and may include a new filter according to technological development.

The clean water flow path 220 may include a first clean water flow path 221, a second clean water flow path 222, a third clean water flow path 223, and a fourth clean water flow path 224. Some of the above components may be omitted.

The first clean water flow path 221 may be formed from the downstream side of the first filter 231 to a point at which the second filter 232 and the third filter 233 are branched. The second clean water flow path 222 may be formed from the downstream side of the second filter 232 to a connection point between the downstream side of the second filter 232 and the downstream side of the third filter 233. The third clean water flow path 223 may be formed from the downstream side of the third filter 233 to a connection point between the downstream side of the second filter 232 and the downstream side of the third filter 233. The fourth clean water flow path 224 may be connected from a connection point of the downstream side of the second filter 232 and the downstream side of the third filter 233 to the fourth filter 234. An outlet flow path 250 may be formed on the downstream side of the fourth filter 234.

The clean water flow path 220 may include a plurality of valves 30 that open or close the flow path to allow or block clean water to flow or from flowing on the clean water flow path 220. The plurality of valves 30 may include a plurality of check valves 31a and 32a. The plurality of check valves 31a and 32a may be installed downstream of the plurality of water purifying filters in the direction in which water flows, so as to control the opening and closing of the clean water flow path. Some of the above components may be omitted.

The plurality of check valves 31a and 32a may include a first check valve 31a and a second check valve 32a. The first check valve 31a may be installed downstream of the second filter 231 to control opening and closing of the second clean water flow path 222. The second check valve 32a may be installed downstream of the third filter 233 to control opening and closing of the third clean water flow path 223. The plurality of check valves may be opened and closed by the control portion 40. Some of the above components may be omitted.

In the water purifier according to the embodiment of the disclosure, the filters may be provided in a refrigerator, and may be disposed inside the refrigerator to supply clean water from a refrigerator dispenser. However, the disclosure is not limited thereto and the filters may be disposed outside the refrigerator to supply clean water.

Figure 6:
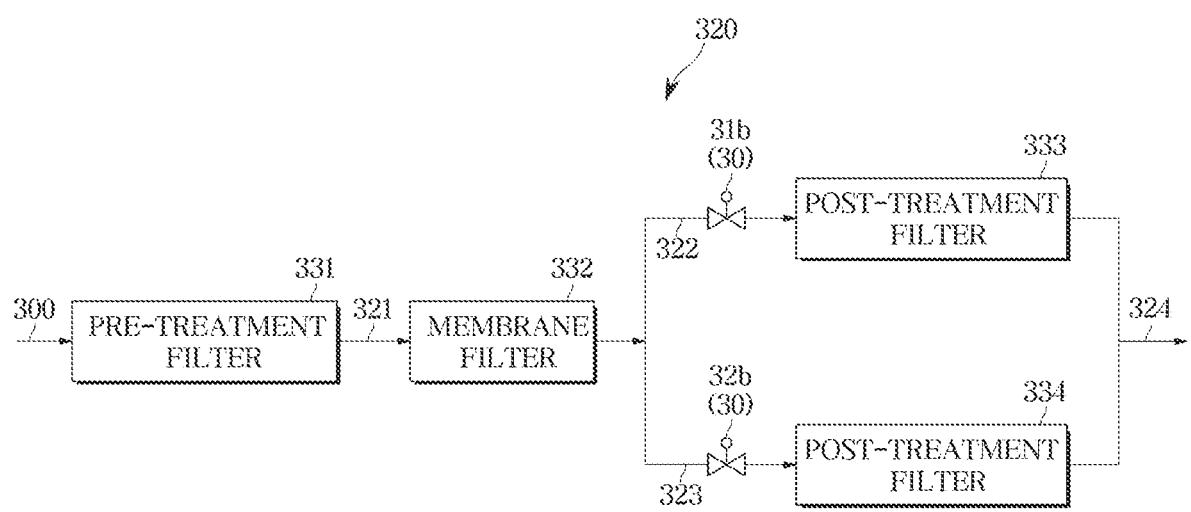
FIG. 6 is a view illustrating a water purifier according to an embodiment of the disclosure.

FIG. 6 is a view illustrating a water purifier according to an embodiment of the disclosure.

Referring to FIG. 6, a water purifier may include a raw water flow path 300 provided to introduce raw water from the outside.

The water purifier 1 may include a clean water flow path 320 connected to the raw water flow path 300 so that raw water may be purified. The water purifier may include a pre-treatment filter disposed on the clean water flow path 320 to filter raw water. The pre-treatment filter may include a first filter 331.

The water purifier may include a water purifying filter disposed on the clean water flow path 320. The water purifying filter may include a second filter 332.

The water purifier may include a plurality of post-treatment filters disposed on the clean water flow path 320. The plurality of post-treatment filters may include a third filter 333 and a fourth filter 334. The plurality of post-treatment filters may include a post-carbon filter. However, the disclosure is not limited thereto, and the third filter 133 and the fourth filter 134 may include a composite filter in which a membrane filter and a post-carbon filter are combined. Some of the above components may be omitted.

By arranging the plurality of post-processing filters in parallel, the effect of increasing the outflow pressure may be obtained. When the filters are provided with the same type, the water treatment volume is reduced by half and thus the life of the filter may be extended. Accordingly, inconvenience due to filter replacement may be minimized and user convenience may be achieved.

Raw water may be filtered in series by the first filter 331 and the second filter 332 and then flow to the third filter 333 and the fourth filter 334. The third filter 333 and the fourth filter 334 may be disposed in parallel. That is, clean water discharged from the second filter 332 may be branched into a plurality of clean water flow paths so as to flow to the third filter 333 and the fourth filter 334. By arranging the plurality of post-treatment filters in parallel, the effect of increasing the outflow pressure may be obtained. When the filters are provided with the same type, the water treatment volume is reduced by half and thus the life of the filter may be extended. Accordingly, inconvenience due to filter replacement may be minimized and user convenience may be achieved. When the filters are provided in different types, a desired water purifying filter may be used through an inlet valve to be described below.

In various embodiments, the filter may be one of the above described various filters or a combination thereof. Further, the filters according to embodiments of the disclosure are not limited to the above-described filters, and may include a new filter according to technological development.

The clean water flow path 320 may include a first clean water flow path 321, a second clean water flow path 322, a third clean water flow path 323, and a fourth clean water flow path 324. Some of the above components may be omitted.

The first clean water flow path 321 may be formed from the downstream side of the first filter 331 to the second filter 332. The second clean water flow path 322 may be connected from the downstream side of the second filter 332 through a branch point for flowing to the third filter 333 and the fourth filter 334, to the third filter 333. The third clean water flow path 323 may be connected from the downstream side of the second filter 332 through a branch point for flowing from to the third filter 333 and the fourth filter 334, to the fourth filter 334. The fourth clean water flow path 324 may be formed from a merging point at the downstream sides of the third filter 333 and the fourth filter 334. The fourth clean water flow path 324 may become an outlet flow path.

The clean water flow path 320 may include a plurality of valves 30 for opening or closing the flow path so as to allow or block clean water to flow or from flowing on the clean water flow path 320. The plurality of valves 30 may include a plurality of inlet valves 31b and 32b. The plurality of inlet valves 31b and 32b may be installed upstream of the plurality of post-treatment filters in the direction in which water flows, so as to control the opening and closing of the clean water flow path. Some of the above components may be omitted.

The plurality of inlet valves 31b and 32b may include a first valve 31b and a second valve 32b. The first inlet valve 31b may be installed on the upstream side of the third filter 333 to control opening and closing of the second clean water flow path 222. The second inlet valve 32b may be installed on the upstream side of the fourth filter 334 to control opening and closing of the third clean water flow path 323. The plurality of inlet valves may be opened and closed by a control portion 40. Some of the above components may be omitted.

In the water purifier according to the embodiment of the disclosure, the filters may be provided in a refrigerator, and may be disposed inside the refrigerator to supply clean water from a refrigerator dispenser. However, the disclosure is not limited thereto and the filters may be disposed outside the refrigerator to supply clean water.

As is apparent from the above, the water purifier can be provided with an increased outflow pressure by arranging a plurality of filters in parallel so that the flow path resistance is reduced.

The water purifier can be provided with a reduced filter replacement cycle by arranging a plurality of filters in parallel so that the life of the filters is extended.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A water purifier comprising:
    a raw water flow path provided to introduce raw water from an outside of the water purifier;
    a clean water flow path connected to the raw water flow path;
    a plurality of pre-treatment filters arranged in parallel on the clean water flow path to filter the raw water, the plurality of pre-treatment filters extending in a first direction from an inlet to an outlet and arranged in a second direction different from the first direction;
    a water purifying filter arranged on the clean water flow path to receive clean water discharged from the plurality of pre-treatment filters, the water purifying filter arranged in a third direction different from the first direction and the second direction with respect to the plurality of pre-treatment filters;
    a post-treatment filter connected to the clean water flow path to receive clean water discharged from the water purifying filter; and
    a drain flow path extending in the second direction different from the first direction through which a portion of clean water discharged from the water purifying filter is diverted before reaching the post-treatment filter to reduce a flow resistance on the clean water flow path.

2. The water purifier of claim 1, wherein the post-treatment filter is arranged in the second direction with respect to the water purifying filter.

3. The water purifier of claim 1, wherein the second direction is perpendicular to the third direction.

4. The water purifier of claim 1, wherein the water purifying filter includes:
    an inlet formed to allow water to be introduced in a longitudinal direction of the water purifying filter; and
    an outlet formed to allow filtered clean water to be discharged in a direction opposite to an introduction direction of the inlet.

5. The water purifier of claim 1, further comprising:
    a plurality of inlet valves installed upstream of the plurality of pre-treatment filters with respect to a direction in which water flows to control opening and closing of the clean water flow path, each of the plurality of inlet valves corresponding to one of the plurality of pre-treatment filters.

6. The water purifier of claim 5, further comprising:
an input portion configured to receive a selection for the plurality of pre-treatment filters, and
at least one processor configured to control opening and closing of the plurality of inlet valves according to information, including the selection for the plurality of pre-treatment filters, received from the input portion.

7. The water purifier of claim 1, further comprising:
an outlet flow path connected to the post-treatment filter to receive clean water discharged from the post-treatment filter,
wherein the post-treatment filter includes:
an inlet connected to the clean water flow path, and
an outlet connected to the outlet flow path.

8. The water purifier of claim 1, further comprising:
a branch pipe arranged on the clean water flow path to branch the raw water to the plurality of pre-treatment filters.

9. The water purifier of claim 8,
wherein the branch pipe includes a first pipe, and
wherein the water purifier further comprises a second pipe formed to allow the clean water discharged from the plurality of pre-treatment filters to be introduced to the water purifying filter.

10. The water purifier of claim 1,
wherein the plurality of pre-treatment filters includes a plurality of composite filters, each of the composite filters being of a same type, and
wherein the water purifying filter includes a membrane filter.

11. A water purifier comprising:
a raw water flow path provided to introduce raw water from an outside of the water purifier;
a plurality of branch flow paths branched from the raw water flow path;
a plurality of pre-treatment filters arranged respectively on the plurality of branch flow paths, the plurality of pre-treatment filters extending in a first direction from an inlet to an outlet and arranged in a second direction different from the first direction;
a water purifying filter provided to receive clean water discharged from the plurality of pre-treatment filters, the water purifying filter arranged in a third direction different from the first direction and the second direction with respect to the plurality of pre-treatment filters;
a post-treatment filter arranged on a clean water flow path and provided to receive clean water discharged from the water purifying filter; and
a drain flow path extending in the second direction, different from the first direction, through which a portion of clean water discharged from the water purifying filter is diverted before reaching the post-treatment filter to reduce a flow resistance on the clean water flow path.

12. The water purifier of claim 11, wherein the post-treatment filter is arranged in the second direction with respect to the water purifying filter.

13. The water purifier of claim 11,
wherein the water purifying filter is arranged in the third direction perpendicular to the first direction and the second direction with respect to the plurality of pre-treatment filters, and
wherein the post-treatment filter is arranged in the second direction with respect to the water purifying filter.

14. A water purifier comprising:
a raw water flow path provided to introduce raw water from an outside of the water purifier;
a plurality of branch flow paths branched from the raw water flow path;
a plurality of pre-treatment filters arranged respectively on the plurality of branch flow paths, the plurality of pre-treatment filters extending in a first direction from an inlet to an outlet and arranged in a second direction different from the first direction;
a water purifying filter provided to receive clean water discharged from the plurality of pre-treatment filters, the water purifying filter arranged in a third direction different from the first direction and the second direction with respect to the plurality of pre-treatment filters;
a post-treatment filter arranged on a clean water flow path to receive clean water discharged from the water purifying filter; and
a drain flow path through which a portion of clean water discharged from the water purifying filter is diverted before reaching the post-treatment filter to reduce a flow resistance on the clean water flow path,
wherein the water purifying filter includes:
an inlet formed to allow water to be introduced in a longitudinal direction of the water purifying filter, and
an outlet formed to allow filtered clean water to be discharged in a direction opposite to an introduction direction of the inlet.

* * * * *